US010771510B2

(12) United States Patent
Stille et al.

(10) Patent No.: US 10,771,510 B2
(45) Date of Patent: Sep. 8, 2020

(54) IMS APPLICATION CONTROL PROTOCOL (71) Applicant: TELEFONAKTIEBOLAGET LM ERICSSON (PUBL), Stockholm (SE)

(72) Inventors: Mats Ola Stille, Bromma (SE); Piotr Kessler, Stockholm (SE); Hubert Przybysz, Hägersten (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 68 days.

(21) Appl. No.: 15/531,784

(22) PCT Filed: Dec. 3, 2014

(86) PCT No.: PCT/EP2014/076459
§ 371 (c)(1),
(2) Date: May 31, 2017

(87) PCT Pub. No.: WO2016/086989
PCT Pub. Date: Jun. 9, 2016

(65) Prior Publication Data
US 2017/0272474 A1 Sep. 21, 2017

(51) Int. Cl.
H04L 29/06 (2006.01)

(52) U.S. Cl.
CPC ...... H04L 65/1069 (2013.01); H04L 65/1006 (2013.01); H04L 65/1016 (2013.01); H04L 65/1093 (2013.01); H04L 65/4046 (2013.01); H04L 29/06 (2013.01)

(58) Field of Classification Search
CPC ............ H04L 65/1006; H04L 65/1069; H04L 65/1016; H04L 65/1093; H04L 65/4046; H04L 29/06
See application file for complete search history.

(56) References Cited

U.S. PATENT DOCUMENTS

| 7,870,196 B2 * | 1/2011 | Costa Requena ....... H04L 63/08 370/445 |
| 7,953,068 B2 | 5/2011 | Bellora et al. |
| 2006/0063517 A1 * | 3/2006 | Oh ..................... H04M 3/42348 455/415 |
| 2006/0233101 A1 * | 10/2006 | Luft .................... H04L 41/0896 370/229 |
| 2006/0239200 A1 * | 10/2006 | Pirzada ............... H04L 43/0811 370/252 |
| 2007/0118881 A1 * | 5/2007 | Mitchell ............... H04L 63/102 726/4 |

(Continued)

OTHER PUBLICATIONS

Campbell et al., "RFC 4975: The Mesage Session Relay Protocol (MSRP)", Sep. 2007, 63 pages.*

(Continued)

Primary Examiner — Todd L Barker (57) ABSTRACT

A method of controlling an application media session between at least two network entities, which comprises establishing a Session Initiation Protocol, SIP, session between each network entity and a SIP application server within the IMS and establishing a media session between each network entity and a Media Resource Function, MRF, controlled by the SIP application server. The method further comprises sending between the network entities, via the media sessions, control messages comprising application control protocol instructions.

18 Claims, 9 Drawing Sheets (56) References Cited

U.S. PATENT DOCUMENTS

| | | | |
|---|---|---|---|
| 2007/0136441 A1* | 6/2007 | Chang | H04L 29/06027 709/219 |
| 2008/0043717 A1 | 2/2008 | Bellora et al. | |
| 2010/0205311 A1* | 8/2010 | Olrog | H04M 7/0057 709/228 |
| 2011/0252151 A1* | 10/2011 | Lu | H04W 80/045 709/228 |
| 2012/0089693 A1* | 4/2012 | Lu | H04L 69/24 709/206 |
| 2012/0275432 A1* | 11/2012 | Lei | H04W 36/0022 370/331 |
| 2013/0201845 A1* | 8/2013 | Cortes Gomez | H04W 48/17 370/252 |
| 2013/0232217 A1* | 9/2013 | Kristiansson | H04L 69/08 709/213 |
| 2015/0201024 A1* | 7/2015 | Balasaygun | H04L 65/1006 709/203 |

OTHER PUBLICATIONS

3rd Generation Partnership Project; Technical Specification Group Services and System Aspects; IP Multimedia Subsystem (IMS); Stage 2 (Release 13), 3GPP TS 23.228 V13.0.0, Sep. 2014.

IMS Profile for Voice and SMS Version 8.0, GSM Association, Official Document IR.92, Apr. 22, 2014.

3rd Generation Partnership Project; Technical Specification Group Core Network and Terminals; IP multimedia call control protocol based on Session Initiation Protocol (SIP) and Session Description Protocol (SDP); Stage 3 (Release 12), 3GPP TS 24.229 V12.5.0, Jun. 2014.

* cited by examiner

IMS APPLICATION CONTROL PROTOCOL

This application is a 371 of International Application No. PCT/EP2014/076459, filed Dec. 3, 2014, the disclosure of which is fully incorporated herein by reference.

TECHNICAL FIELD

The technical field is the control of applications within an IP Multimedia Subsystem.

BACKGROUND

The Internet Protocol (IP) Multimedia Subsystem (IMS) is a well-known Third Generation Partnership Project (3GPP) standard allowing sessions to be set up between two or more parties for a broad variety of services such as voice or video call, interactive messaging sessions or third party specific applications. A few common enablers are defined by 3GPP for common usage among all these services. Examples on such enablers are capability discovery and subscribing to conference events to be used by for example an ad-hoc voice call conference for clients/devices to identify who leaves and enters the conference.

The protocol chosen by 3GPP is the Session Initiation Protocol (SIP). SIP provides a mechanism for the registration of user agents and for setting up multimedia sessions. The SIP REGISTER method enables the registration of user agent's current location and the INVITE method enables the setting up of a session.

SIP does not only allow the registration of users and the set-up of connections. Modification of sessions is also possible, such as adding media to a session or new user agents joining multicast sessions such as video conferencing. In order to assist a user agent in discovering the capabilities of other user agents and events that occur within the session, a number of other SIP methods have been developed. The SIP OPTIONS method enables a user agent to query another user agent or proxy server about its capabilities. This allows a client to discover information about supported methods, content types, extensions, codecs etc. The SUBSCRIBE method is used to request asynchronous notification of an event or set of events at a later time. It is complemented by the NOTIFY command by which these notifications are enacted.

Although SIP enablers such as SUBSCRIBE and OPTIONS are powerful, they are also resource intensive and use valuable signalling bandwidth. IMS separates the control functions and the user traffic, and resource intensive methods such as those used by SIP can place a strain on resources dedicated to signalling within the IMS. For example, signalling must be routed through the home network. Acknowledgement and retransmission messages as well as provisional responses are incorporated in SIP which increase the amount of signalling required. In addition, new logic and commands for networks can only be developed through the standardisation process.

SUMMARY

Accordingly, in a first aspect of the present invention, there is provided a method of controlling an application media session between at least two network entities. The method comprises establishing a Session Initiation Protocol, SIP, session between each network entity and a SIP application server within the IMS and establishing a media session between each network entity and a Media Resource Function, MRF, controlled by the SIP application server. The method further comprises sending between the network entities, via the media sessions, control messages comprising Application Control Protocol (ACP) instructions.

The media session may be established on a reliable transport layer protocol.

The messages may be sent by means of the Message Session Relay Protocol (MSRP).

Optionally the ACP instructions contain information relating to at least one of: a capability of a network entity, a connectivity status of a network entity or a connectivity requirement of a network entity.

Optionally the information relating to a capability of a network entity comprises information relating to a sharing capability.

Optionally the sharing capability comprises one or more of: white boarding, map sharing and document sharing.

Optionally the media session comprises a dedicated Evolved Packet System, EPS, bearer.

Optionally the dedicated EPS bearer has a lower Quality of Service (QoS) than a default EPS bearer.

Optionally the media session is used for ACP instructions and at least one additional session is provided for user traffic.

Optionally the at least one additional session is carried on an unreliable transport protocol.

According to a second aspect of the invention there is provided an apparatus for use in User Equipment (UE) in a communications network. The apparatus comprises processor circuitry and a storage unit for storing instructions executable by the processor circuitry, whereby the apparatus is operative to establish a SIP session with a SIP application server within an IMS, establish a media session with an MRF controlled by the SIP application server and to send and/or receive via the media session, control messages comprising application control protocol instructions.

According to a third aspect of the invention there is provided an apparatus for use in a Media Resource Function of an IP Multimedia Subsystem comprising: processor circuitry; a storage unit storing instructions executable by the processor circuitry whereby the apparatus is operative to receive instructions from a SIP application server controlling the MRF to establish a media session, establish the media session with a network entity within the media session, receive and interpret control messages comprising an application control protocol instruction; and forward the control messages to at least one other network entity.

According to a fourth aspect of the invention there is provided user equipment comprising apparatus according to the second aspect of the invention.

According to a fifth aspect of the invention there is provided a network node comprising apparatus according to the third aspect of the invention.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Figure 1:
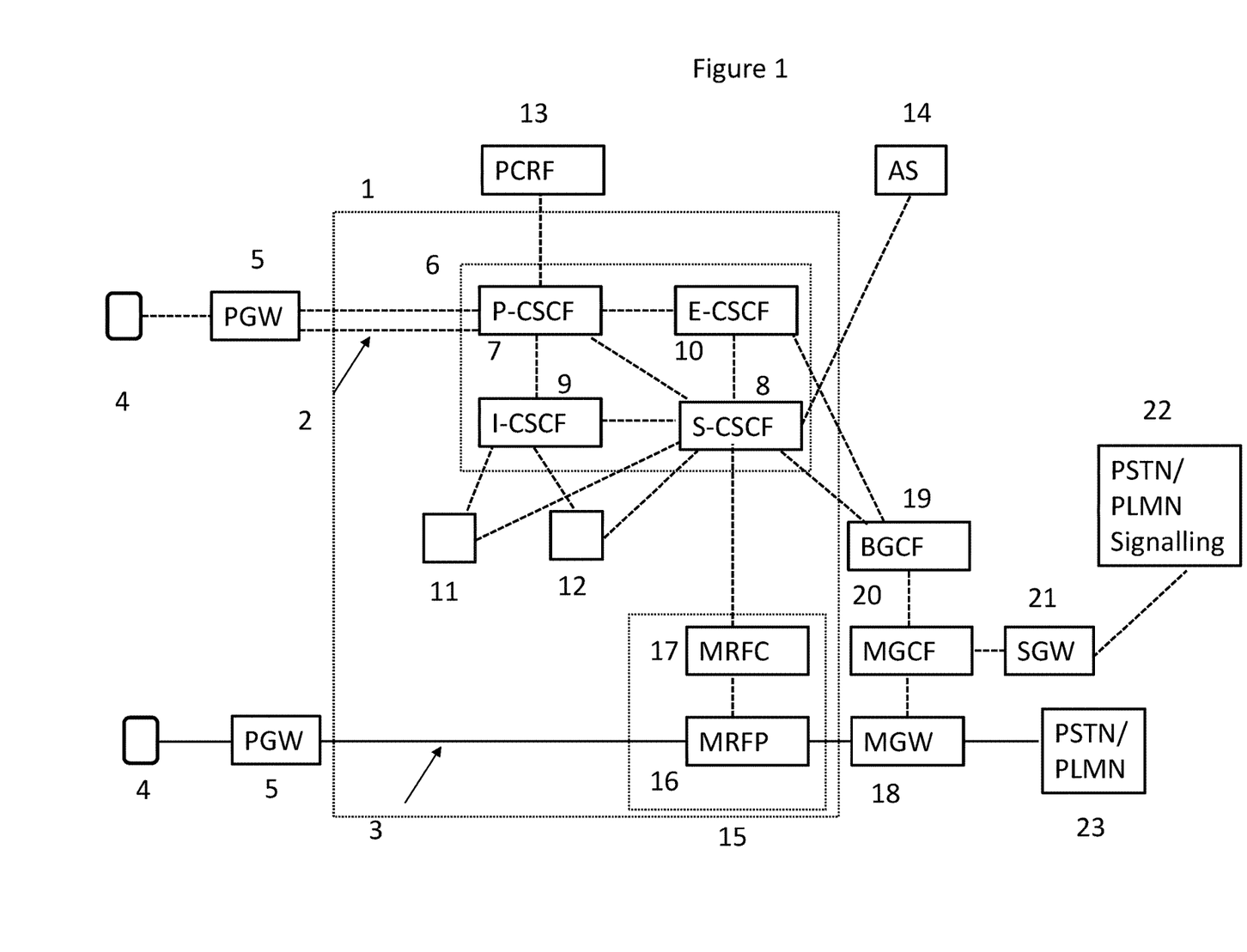
FIG. 1 is a schematic diagram of the IMS architecture.

FIG. 1 is a schematic view of an IP Multimedia Subsystem (IMS) (1) and related network nodes and systems. The separation of the signalling and the user traffic is illustrated by showing the signalling (2) as a dotted line and the traffic flow (3) as a solid line. Both the signalling and the traffic start and terminate at the User Equipment (UE) (4) which sends both its signalling messages and user traffic via an access network (not shown) to the Packet Data Network (PDN) Gateway (PGW) (5) and thence to the IMS (1). The signalling function is the start of the set-up of any telecommunications session, so this will be considered first.

The controlling core of an IMS is the Call Session Control Function (CSCF) (6), which comprises four types of server, the Proxy CSCF (P-CSCF) (7), the Serving CSCF (S-CSCF) (8), the Interrogating CSCF (I-CSCF) (9) and the Emergency CSCF (E-CSCF) (10). There are additionally two databases, the Home Subscriber Server (HSS) (11) and the Subscription Locator Function (SLF) (12). The HSS (11) is a master database, which contains subscription related information, performs authentication and authorisation and can provide information about a subscriber's location and Internet Protocol (IP) information. The Subscriber location function (12) provides information about the HSS which is associated with a particular user. It enables the CSCF's to find the address of the HSS assigned to a User Equipment when several HSS's are deployed.

The first point of contact for a UE (4) with the IMS is the P-CSCF (7). The P-CSCF (7) receives requests from the UE (4) or from the S-CSCF and transfers the requests respectively to the S-CSCF (8) or the I-CSCF (9) or to the UE (4). Another function of the P-CSCF comprises detecting emergency calls and transferring them to the E-CSCF (10). The P-CSCF may be located in a Visited Public Mobile Network (VPMN).

The S-CSCF (8) is the central node of the signalling plane and is always in the home network of UE (4). The S-CSCF decides to which application servers signalling messages are sent. The principal role of the I-CSCF (9) is to identify the correct S-CSCF and to forward requests to and from that S-CSCF.

After the SIP request has been sent through the CSCF (6), the next stage depends on whether the request is bound for another section of IMS (1) or an outside network. If the control message is sent to an outside network, it is sent to the Border Gateway Control Function (BGCF) (19), the Media Gateway Control Function (MGCF), (20) the SGW Serving Gateway (21) and thence to the Public Switched Telephone Network (PSTN)/Public Land Mobile Network (PLMN) signalling (22). If the control messages remain within IMS (1), they are sent, after going from the S-CSCF (8) to the AS (14) and back again, to an S-CSCF of the target User Equipment. The user traffic, which can include voice, video or data, starts at the UE (4) goes through an access network (not shown), through the Packet Data Network (PDN) Gateway (PGW) (5) and thence to the Media Resource Function (MRF) (15). The Media Resource Function comprises two functions, the Media Resource Function Processor (16) and the Media Resource Function Controller (17). Depending on its destination, user traffic may then pass to the Media Gateway (MGW) (18) and thence to the PSTN/PLMN (23).

Figure 2:
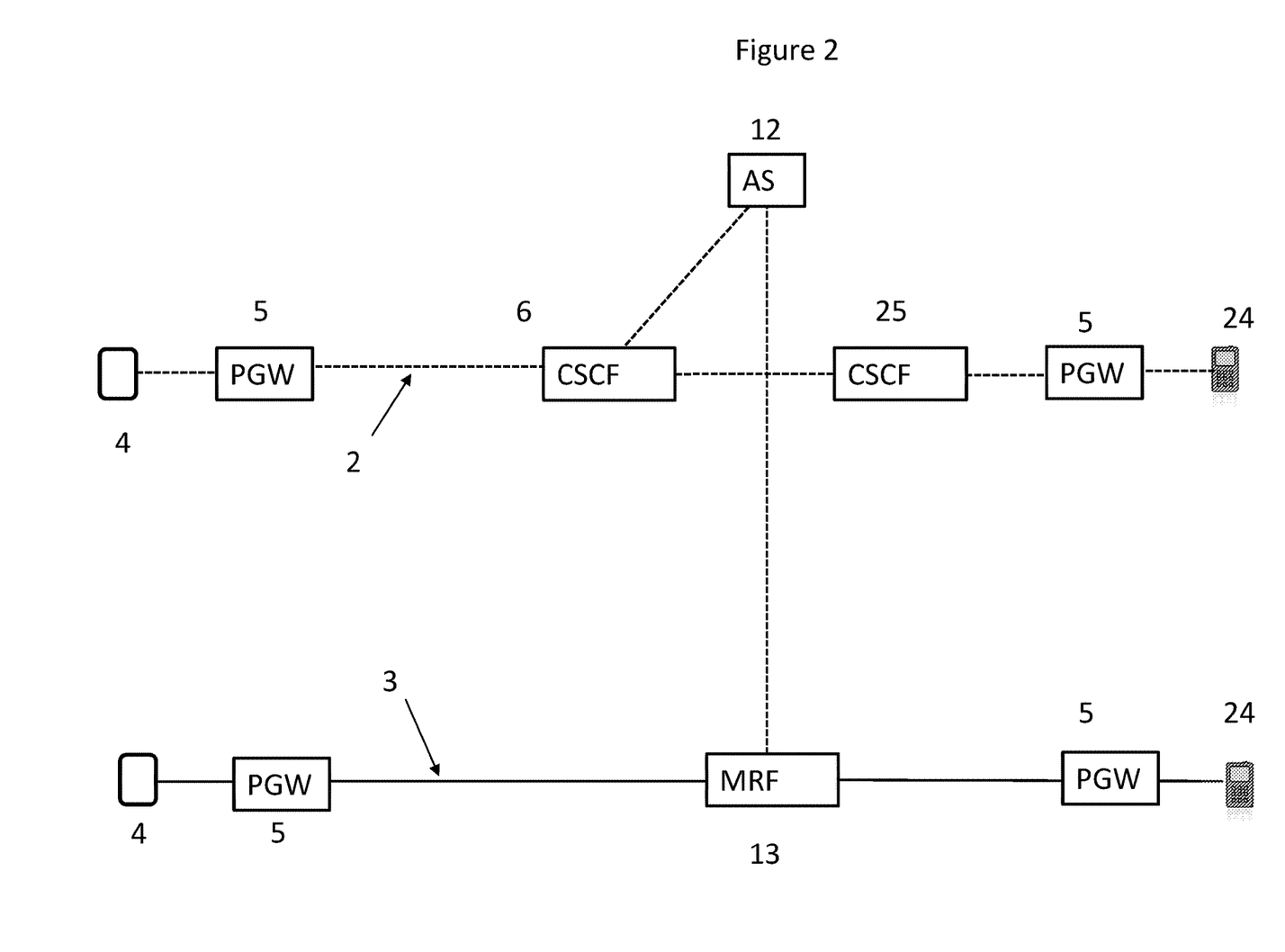
FIG. 2 is a schematic diagram of the routes of the control and media sessions through an IMS architecture.

FIG. 2 is a schematic diagram of signalling (2) and traffic flow (3) as they occur for communication between two IMS enabled devices, the UE (4) and the second UE (24), which is the target device for the communications session. The signalling passes from the UE (4) to the CSCF (25) associated with the UE (4). The user traffic again starts at the UE (4) and goes through the MRF (15) and on to the second UE (24).

Of crucial importance to the IMS is the Session Initiation Protocol (SIP). SIP is an application layer protocol used for controlling multimedia sessions over IP networks. It is a text based protocol which uses the request/response model. SIP defines messages sent between endpoints, which govern establishment, termination and other essential elements of a multimedia connection. SIP can be used for creating, modifying and terminating sessions consisting of one or more media streams. It can be both unicast and multicast. Examples of applications which SIP can establish and control are video conferencing, streaming multimedia distribution, instant messaging, presence information, file transfer, fax over IP and online games.

The basic commands used to set up a media session are the REGISTER method and the INVITE method. The REGISTER method allows a user agent to register its location with a registrar server. The INVITE method is the method by which a session is established with another user agent. Other methods in support of these basic commands include the acknowledgement response (ACK), the CANCEL request, the BYE request to end participation in a session.

Figure 3:
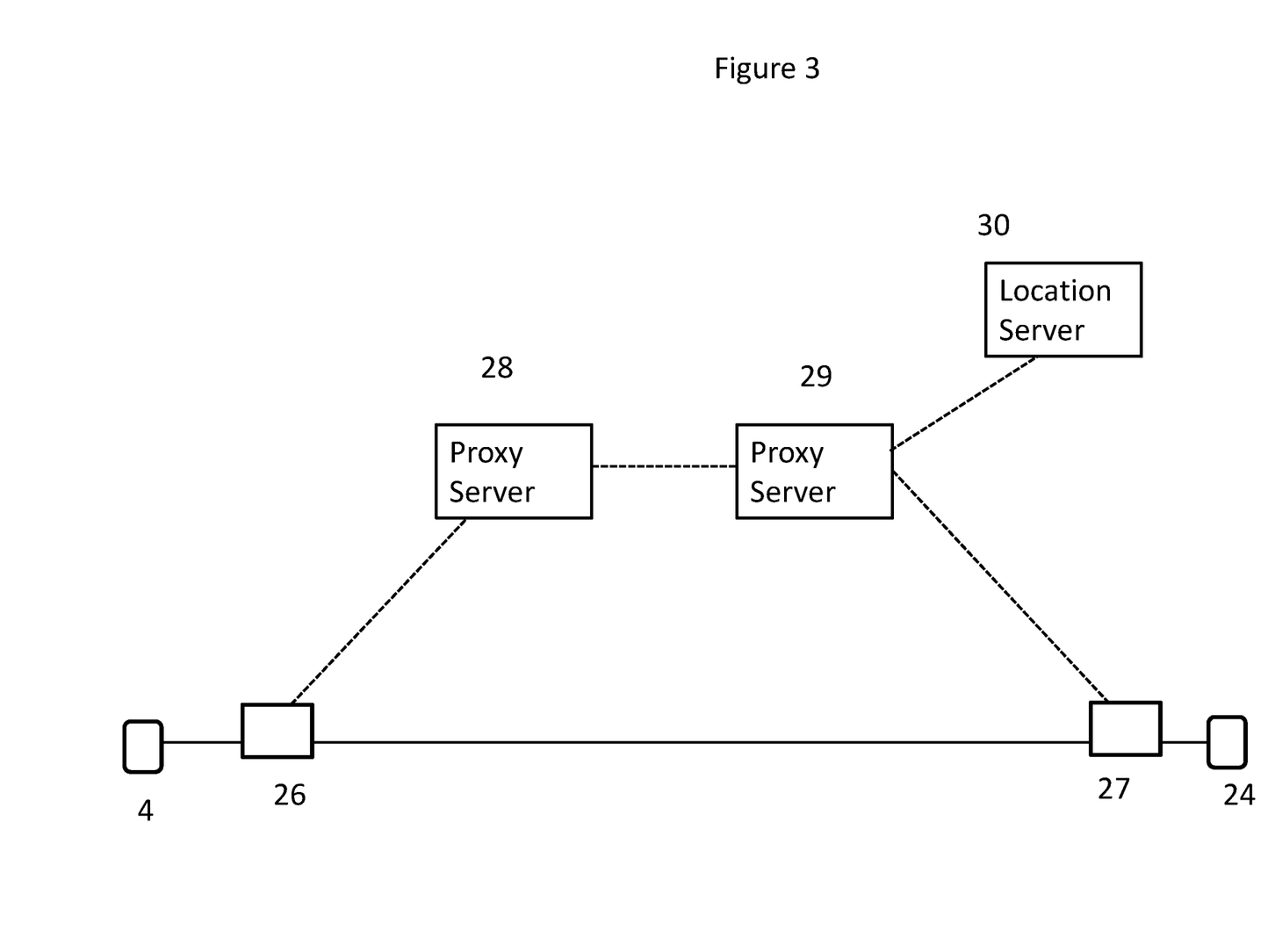
FIG. 3 is a schematic diagram of the process of establishing a SIP session.

FIG. 3 illustrates the arrangement of entities required for establishment of a SIP session between the first UE (4) and the second UE (24). The initiation starts at the UE (4), which comprises a SIP User Agent (UA) (26), a logical entity which creates requests and establishes transactions. A SIP INVITE request is sent from the user agent (26) to a proxy server (28). The INVITE request is then forwarded to the proxy server (29) associated with the target User Agent (27) associated with the second UE (24). The Location server (30) is used to obtain the location (IP address) of the target user agent (27). A media session will be established when an acknowledgment for the request is returned from the target user agent (27) to the user agent (26). In an IMS, the CSCF's act as proxy servers and the HSS with the assistance of the SLR act as the location server.

Figure 4:
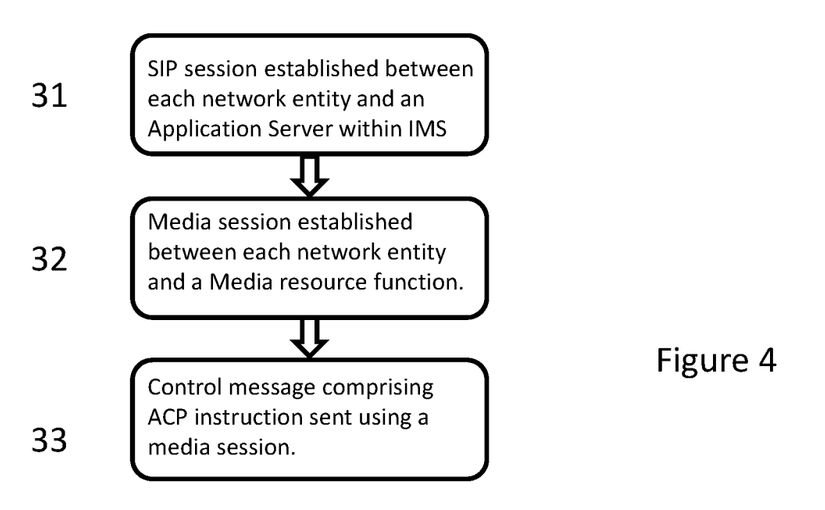
FIG. 4 is flow diagram for a method of sending an application control protocol instruction by means of a media session.

In order to overcome the problems with SIP enablers described above, a mechanism for transferring control commands through a media session is provided. An Application Control Protocol (ACP) is defined which provides instructions for serving network entities of an application communication with information such as the capabilities of each network entity, when a network entity enters or leaves the application communication and current running application instances. FIG. 4 is a flow chart which illustrates the stages of the set up procedure for implementing an ACP. The first step is to establish (31) a SIP session for each network entity between the entity and an application server. The second step is to establish (32) a media session between each network entity and a Media Resource Function (MRF) controlled by the SIP application server. Once the media session is established, ACP instructions control messages may be transmitted between network entities by means of the media session.

Figure 5:
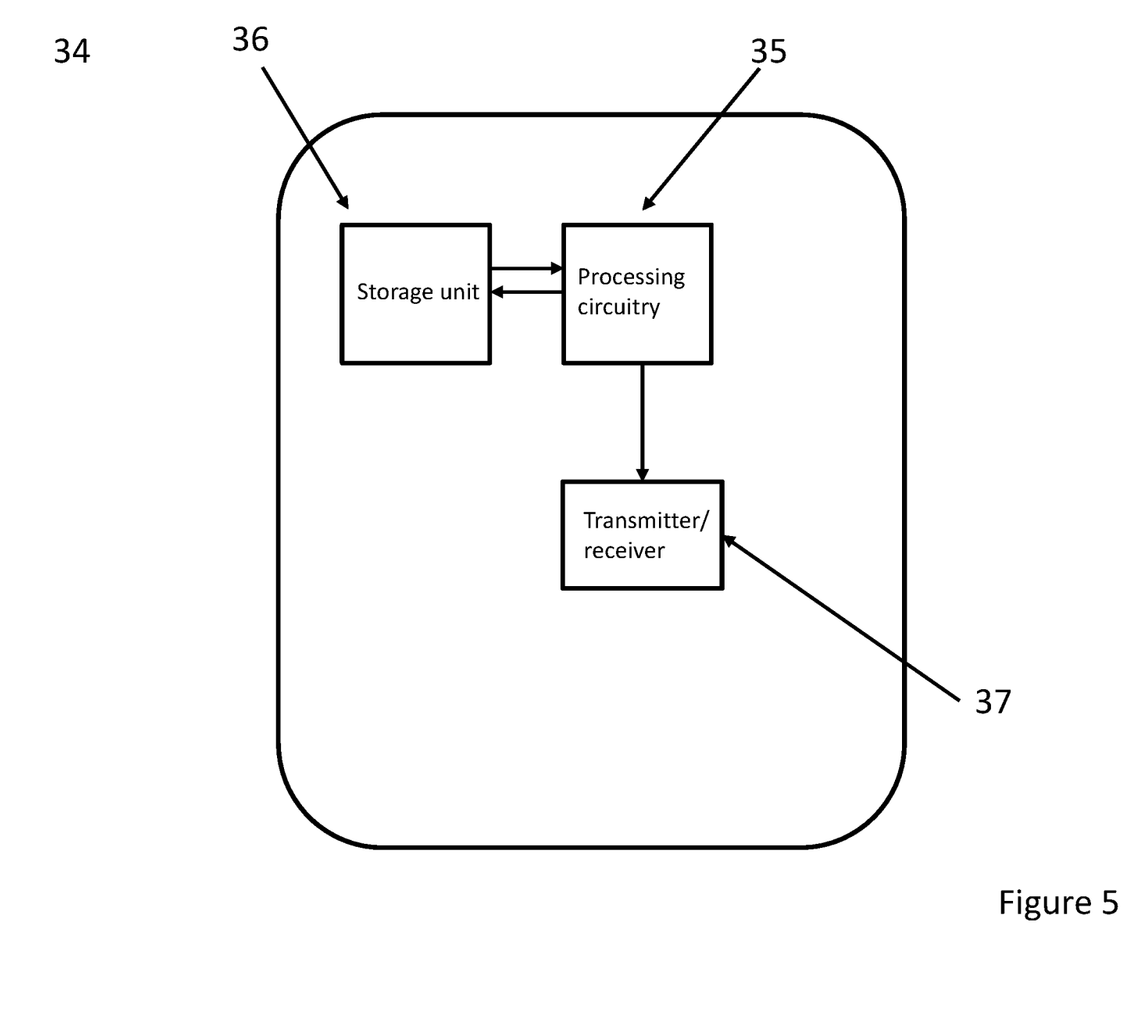
FIG. 5 is a schematic diagram of user equipment.

FIG. 5 is a schematic diagram apparatus (34) for use in a UE for implementing the user side of the process of FIG. 4. The apparatus comprises processing circuitry (35), a storage unit (36) and a transmitter/receiver (37). The processing circuitry is configured to interact with the storage unit (36) in order to set up SIP sessions and media sessions, and to send and receive control messages via the media session, by communication with other network entities via the transmitter/receiver (37).

Figure 6:
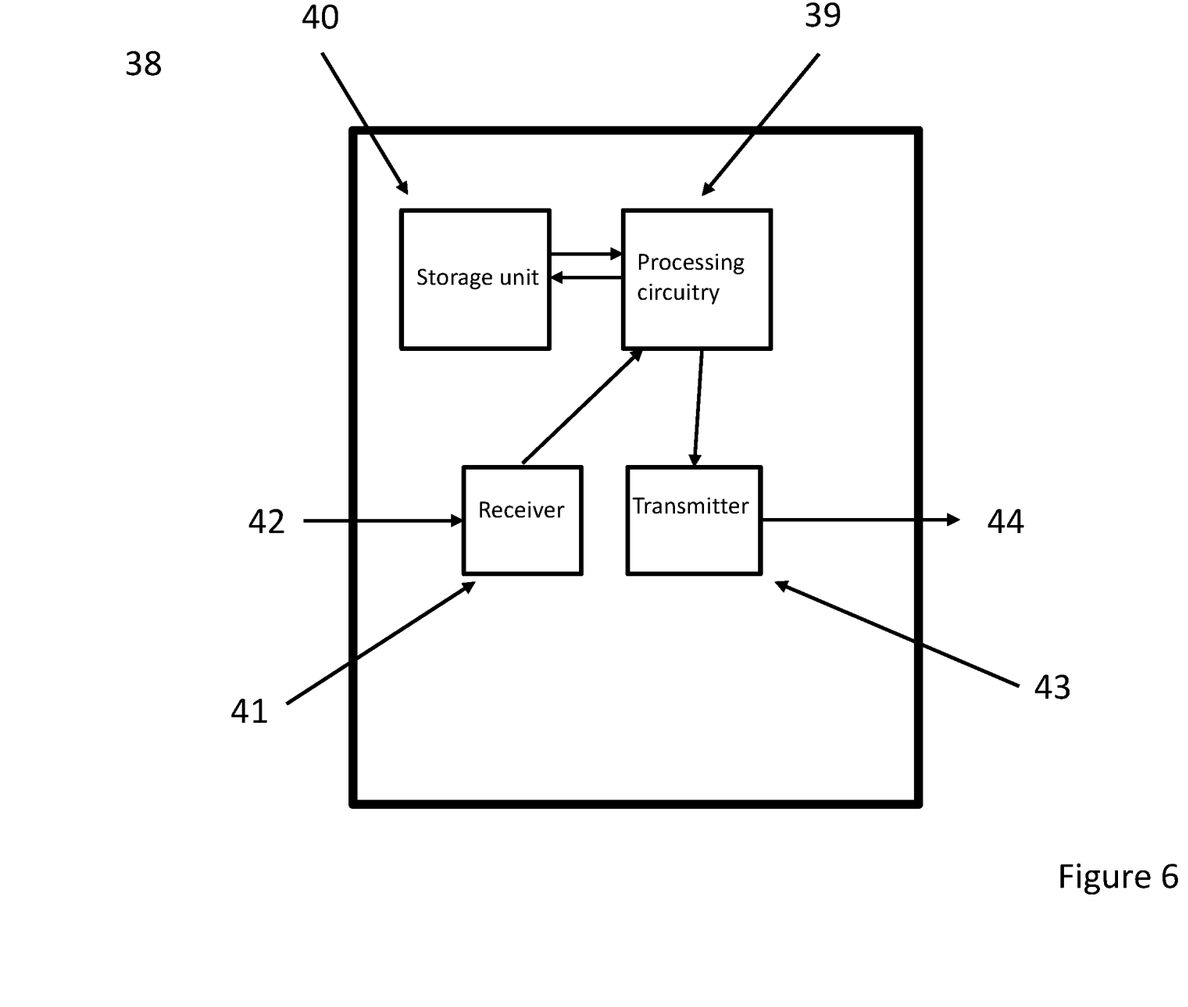
FIG. 6 is a schematic diagram of a Media Resource Function apparatus.

FIG. 6 is a schematic diagram showing apparatus located at the MRF. This apparatus (38) again comprises processing circuitry (39) which interacts with a storage unit (40), and with a receiver (41) and a transmitter (43) which respectively receive incoming signals (42) and send outgoing signals (44). The apparatus (38) is configured to receive instructions from a SIP application server controlling the MRF to establish a media session, establish a media session with a network entity and within the media session, receive and interpret control messages comprising an application control protocol instruction. It is further configured to receive control messages via the receiver (41) from the network entities and to forward via the transmitter (43) the control messages to at least one other network entity.

SIP is defined for both reliable transport layer protocols such as Transmission Control Protocol (TCP) and unreliable protocols such as the User Datagram Protocol (UDP). In order to ensure the receipt of messages when UDP is used, SIP has its own mechanism for acknowledgement and retransmission. Although this provides an assurance that SIP messages will be delivered, it does require additional signalling resources to implement. In an embodiment of the present invention a reliable transport layer protocol is used for the media session. This allows the ACP to be encapsulated within a protocol which can dispense with acknowledgement and retransmission mechanisms.

An example of an application layer messaging protocol which is used only on reliable transport layer protocols is Message Session Relay Protocol (MSRP). MSRP is not defined for connection-less protocols, such as UDP. This allows for a simplification of the protocol as no acknowledgement and retransmission is necessary, since it can rely on the mechanisms provided in the transport layer. In an embodiment, ACP instructions are encapsulated in MSRP messages.

MSRP has a similar syntax as other IETF text based protocol such as SIP, HTTP and RTSP. As in SIP, a request/response protocol model is used. URI's are used to identify destinations and a message contains headers and a body that can carry any type of data. MSRP is simpler than SIP. The first two headers must be To-Path and From-Path and the last must be Content-Type. This significantly reduces the complexity of parsers. Messages must also end with seven dash characters, followed by a transaction identifier which appears in the first line, these are followed by a continuation flag, which is a single character and end of line (CRLF). This last line at the end of messages makes it rather simple to find and detect the message boundaries. These features make MSRP an attractive choice for use with the ACP. However the person skilled in the art will appreciate that other options are available including other instant messaging protocols.

The invention is not limited to any one messaging protocol or any one means of encapsulating ACP instructions.

Figure 7:
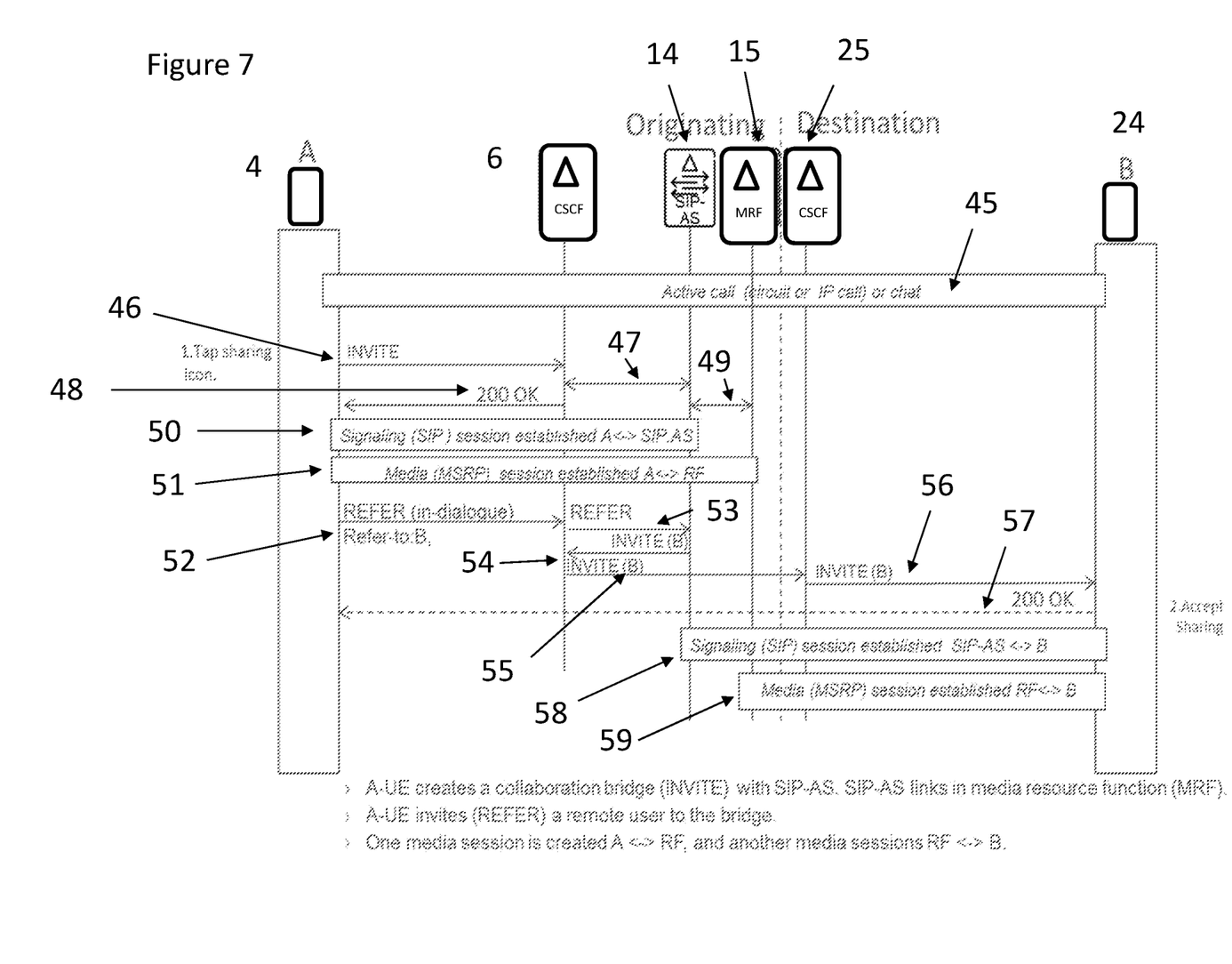
FIG. 7 is a connection diagram for the establishment of SIP session and an associated media session.

FIG. 7 is a connection diagram illustrating the process of setting up a Media Session Resource Protocol Session. There may be already an active call (45) between the first UE (4) and the second UE (24), to which a new session is to be added or alternatively, the session may be a completely new session. Although the 'phone symbol is used for the UE's, this could also be a tablet or a PC or other user equipment. It is also possible for it to be a combination of different equipment. An example might be a combination of a 'phone and a tablet, where for example the user has an on-going call (45) using his 'phone and then uses his tablet to establish a multimedia session.

The first stage of the set-up of the MRSP session is to establish a SIP session between the first UE (4) and the AS (14) and between the AS (14) and the second UE (24). The SIP session starts with an INVITE message (46) which is sent from the first UE (4) to the CSCF (6). This INVITE message is sent to the SIP AS (14) which responds with an acknowledgement message (47) which is then sent back to the first UE (48). This establishes a signalling session (50) between the first UE (4) and the SIP AS (14). The SIP INVITE message contains a Session Description Protocol (SDP) field which indicates that there is a requirement to set up a Media Session Resource Protocol (MRSP) session between the first UE (4) and the MRF (15). Once the SIP session has been set up, communication (49) between the SIP AS (14) and the MRF (15) will enable the establishment of an MSRP Session (51) between the first UE (4) and the MRF (15). The next stage of the setting up of the MSRP session is to invite the second UE (24) into the session. In the example given the REFER method is used to request the SIP AS (14) to send an invitation to the second UE (24). However, the person skilled in the art will appreciate that other SIP methods could be used, for example, another INVITE message. The invention is not limited to any one SIP method or set of messages. REFER message (52) is transmitted to the CSCF (6), whereupon it is forwarded (53) to the SIP AS (14). In response to the REFER message the CSCF (6) creates an INVITE message. This is then transmitted (54) firstly to the CSCF (6) and from there it sent (55) onto the CSCF (25) associated with the second UE (24) and thence sent (56) to the second UE (24). An acknowledgement message, 200 OK (57), is returned to the first UE (4). Once this signalling is complete, a SIP session (58) is established between the second UE (24) and the SIP AS (14) and a media session (59) is established between the second UE (24) and the MRF (15).

FIG. 7 shows the media session as an MSRP session. However, the media session may include user traffic carried on different protocols. Alternatively additional sessions may be set up to carry user traffic separately from the ACP messages. The person skilled in the art will appreciate that many different protocols may be used and the invention is not limited to any one application layer or transport layer protocol or combination of them.

Figure 8:
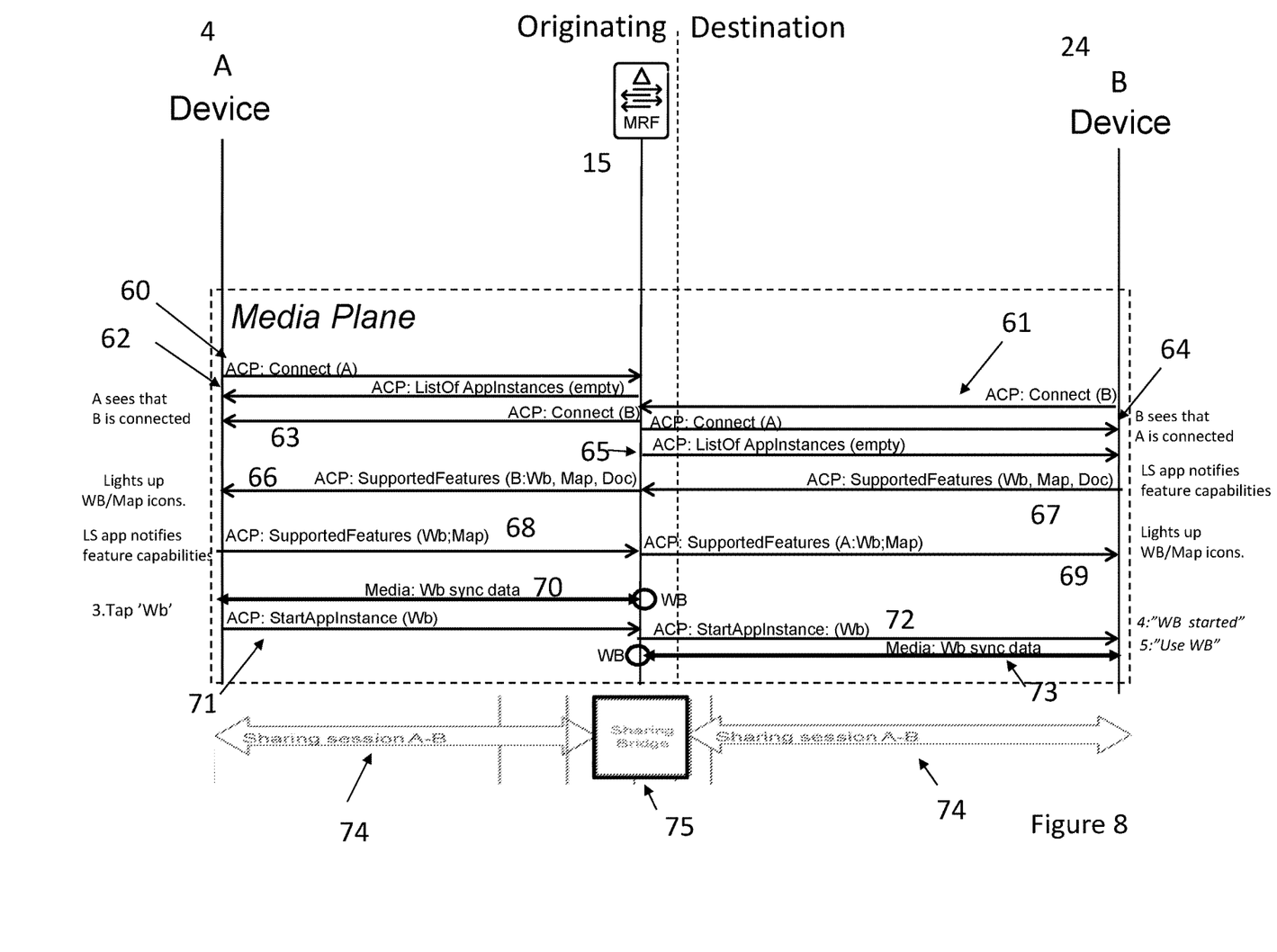
FIG. 8 is a connection diagram for the transmission of application control protocol instructions over Message Session Relay Protocol.

Once the SIP and media sessions are established, ACP instructions can be transmitted between network entities using the media session. FIG. 8 is a connection diagram which illustrates how this can occur. Once the SIP and the MSRP sessions are established, both the first UE (4) and the second UE (24) declare to the MRF that they are connected. This is enacted by means of an ACP connect message (60, 61), which in an embodiment is carried by an MSRP SEND message. The MRF (15) will forward (63, 64) these messages to other network entities so that each participant can see that a peer participant has joined the session. In addition to the forwarding of these messages a ListOfAppinstances (empty) notification will be sent to the network entities (62, 65) to indicate that there are as yet no applications running in the session.

In addition to the indication that an entity has joined the session, in an embodiment, connect messages further include a time-expiry value indicating how often the participant will send a keep-alive message. Such messages enables the server to detect when a network entity is still connected or if the connection is lost. In addition, it saves network entities from having to send a SIP SUBSCRIBE message across the network CSCF nodes to subscribe to conference events and keep track as live sharing participants come and go.

Another feature of ACP allows each network entity to be able to declare which live sharing capabilities it supports. Examples of such sharing capabilities are whiteboarding, document sharing and map sharing. As an example of the exchange of information concerning capabilities, in FIG. 8, the first UE (4) is shown as having the capability to support whiteboarding and map sharing and the second UE (24) has the capability to support whiteboarding, map sharing and document sharing. In an embodiment, ACP has a SupportedFeatures instruction. The first UE (4) sends a SupportedFeatures (68) message, indicating that it can support whiteboarding and map sharing, to the MRF (15), which forwards it (69) to the second UE (24). Likewise, the second UE (24) sends (67) a SupportedFeatures message to the MRF (15) indicating that it can support whiteboarding, map sharing and document sharing. The MRF (15) then forwards this message (66) to the first UE. In this way all the network entities receive information concerning the capabilities of other participants, without the need for them to send a SIP OPTIONS message with its associated use of signalling resources.

Once the indications of capabilities have been exchanged, applications can be shared. An example of the commencement of a shared application is given in FIG. 8, with the use of whiteboarding between the first UE (4) and the second UE (24). Whiteboarding synchronisation data is transmitted (70) from the first UE (4) to the MRF (15), followed by a StartAppinstance message (71). The StartAppinstance message is forwarded (72) to the second UE (24), followed by an exchange of whiteboarding synchronisation information (73). Sharing session (74) can now be established between the first UE (4) and the second UE (24), using the MRF (15) as a sharing bridge (75).

Figure 9:
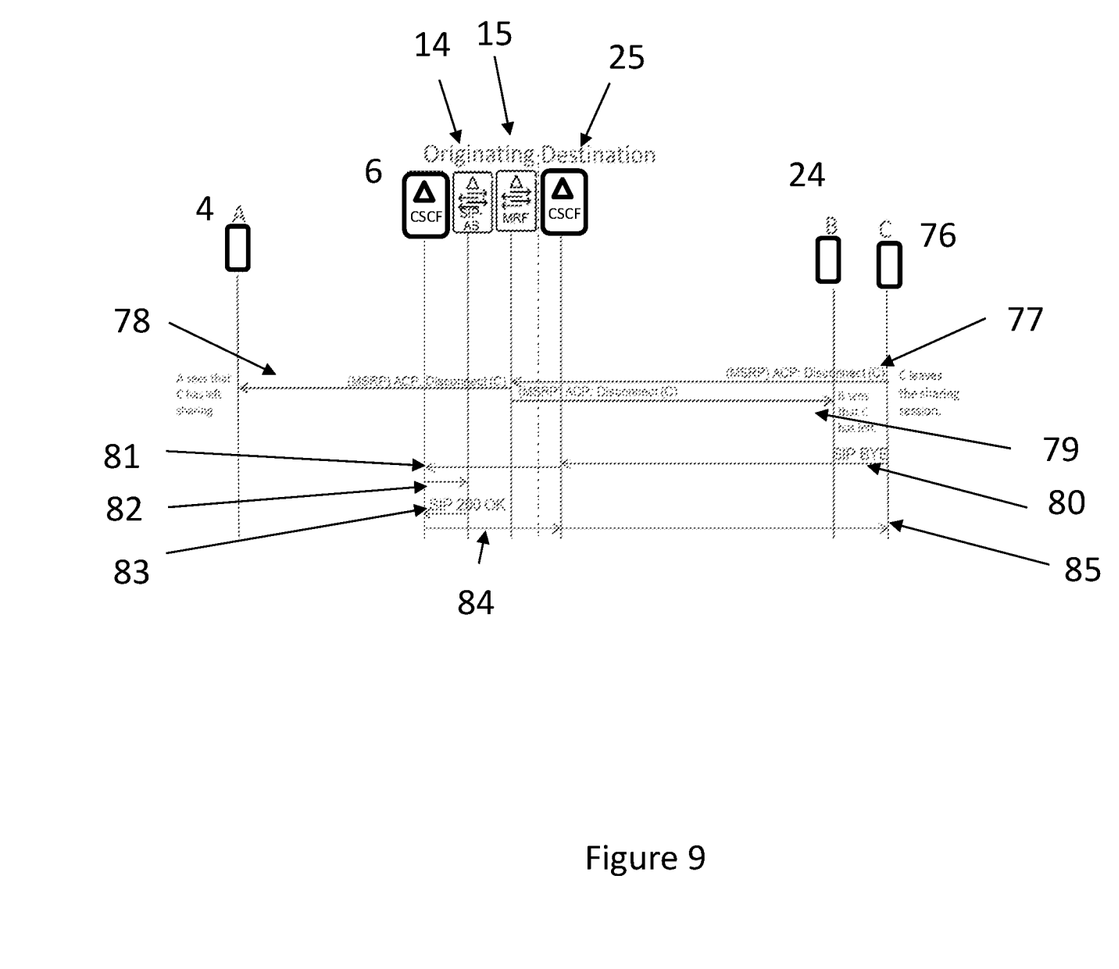
FIG. 9 is a connection diagram for the termination of the participation of a network entity in an MSRF session.

FIG. 9 is a connection diagram showing the process of disconnection from a session. In this example, there is a third UE (76) involved in the session. The third UE (76) wishes to terminate its involvement and so sends an ACP disconnect message to the MRF (15), which is passed on (78, 79) to the first UE (4) and the second UE (24). In an embodiment the ACP disconnect message is sent inside an MSRP SEND message. The SIP sequence for the same process is also shown. A SIP BYE message (80) is sent to the CSCF (25) associated with the third UE (76), which passes (81) the message on to the CSCF (6). The CSCF (6) communicates (82) with the SIP AS (14), which responds (83) with a SIP 200 OK message, which is in turn passed (84) to the CSCF (24) and thence (85) to the third UE (76). The other two participants know about the third UE (76) leaving the session from the ACP messages. The ACP signalling saves the server from having to send a SIP NOTIFY across CSCF nodes and using valuable signalling resources.

The above embodiments give examples based on MSRP with a few examples of ACP instructions. However, the person skilled in the art will appreciate that other protocols may be used to encapsulate the ACP messages and that many more options and commands may be incorporated into ACP messages. The invention is not limited to any one protocol for transmitting the ACP messages nor is it limited to any set of ACP messages. Additionally all combinations of different ACP commands and carrying protocols are within the scope of the invention.

In an embodiment, the ACF messages share a session with user traffic. In an alternative embodiment, separate sessions may be provided for the ACP messages and the user traffic. In an embodiment, this may involve the use of a reliable transport protocol such as TCP/IP for the media session provided for the ACP messages and an unreliable protocol such as UDP for the session provided for the user traffic, which typically comprises voice and/or video traffic. The person skilled in the art will appreciate that there are many combinations of different sessions with different transport protocols which are possible and the invention is not limited to any one transport protocol or any combination of media sessions over different transport protocols.

In an embodiment, the signalling and the media session are implemented on the Evolved Packet System (EPS). In an embodiment, the SIP signalling is carried on a default bearer and the media session is carried on a dedicated bearer. In an embodiment the ACP messages may share a bearer with user traffic. In another embodiment, one or more additional bearers may be set up for user traffic, separate from the ACP messages. In yet another embodiment, the ACP messages share a bearer with some user traffic, but additional bearers are also present for user traffic.

The use of different bearers allows the use of different quality of service for the SIP signalling and the media session carrying the ACP messages. In an embodiment, the default bearer carrying the SIP signalling may have a high priority Quality of Service (QOS) class (typically QOS Class Indicator (QCI) 5) and the media session may be carried with a bearer with lower QOS. In an embodiment a QCI of 9 may be used, which gives only best effort traffic. The person skilled in the art will appreciate that other QCI's may be used and the invention is not limited to any one QCI or combinations of QCI's.

In addition to EPS, the signalling and media sessions may be implemented in a third generation network. If a third generation system is used, then in an embodiment there would be no separate bearers for SIP signalling and media sessions.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for use in a communications network comprising an Internet Protocol Multimedia Subsystem (IMS) to control an application media session between at least two User Equipments, the method comprising:
   receiving, from a User Equipment, a SIP INVITE message including a Session Description Protocol (SDP) field indicating to set up a Message Session Relay Protocol (MSRP) media session between the User Equipment and the IMS;

establishing a Session Initiation Protocol (SIP) session between the User Equipment and a SIP application server within the IMS;

establishing the MSRP media session between the User Equipment and a Media Resource Function (MRF) controlled by the SIP application server;

receiving, via the MSRP media session, an indication of a sharing capability that is supported by the User Equipment; and forwarding, via the MRF, the indication of a sharing capability to a second User Equipment, the forwarding including communicating the indication of the sharing capability over the MSRP media session between the second User Equipment and the MRF;

wherein the method further comprises:
sending, to the second User Equipment, a second SIP INVITE message;
establishing the SIP session between the second User Equipment and the SIP application server;
establishing the MSRP media session between the second User Equipment and the MRF;
receiving, from the User Equipment, a StartAppinstance message corresponding to an application specified in the indication of the sharing capability;
forwarding the StartAppinstance message to the second User Equipment; and
after forwarding the StartAppinstance message, exchanging synchronization information corresponding to the application between the User Equipment and the second User Equipment.

2. The method of claim 1, wherein the sharing capability comprises one or more of: white boarding, map sharing or document sharing.

3. The method of claim 1, wherein the MSRP media session comprises a dedicated Evolved Packet System (EPS) bearer.

4. The method of claim 3, wherein the dedicated EPS bearer has a lower Quality of Service than a default EPS bearer.

5. The method of claim 1, wherein the MSRP media session is used for Application Control Protocol (ACP) instructions and at least one additional media session is provided for user traffic.

6. The method of claim 5, wherein the at least one additional media session is carried on an unreliable transport protocol.

7. An Internet Protocol Multimedia Subsystem (IMS) apparatus comprising:
processor circuitry; and
a storage unit having instructions executable by the processor circuitry to perform operations comprising:
receiving, from a User Equipment, a SIP INVITE message including a Session Description Protocol (SDP) field indicating to set up a Message Session Relay Protocol (MSRP) media session between the User Equipment and the IMS;
establishing a Session Initiation Protocol (SIP) session between the User Equipment and a SIP application server within the IMS;
establishing the MSRP media session between the User Equipment and a Media Resource Function (MRF) controlled by the SIP application server;
receiving, via the MSRP media session, an indication of a sharing capability that is supported by the User Equipment; and
forwarding, via the MRF, the indication of a sharing capability to a second User Equipment, the forwarding including communicating the indication of the sharing capability over the MSRP media session between the second User Equipment and the MRF;
wherein the operations further comprise:
sending, to the second User Equipment, a second SIP INVITE message;
establishing the SIP session between the second User Equipment and the SIP application server;
establishing the MSRP media session between the second User Equipment and the MRF;
receiving, from the User Equipment, a StartAppinstance message corresponding to an application specified in the indication of the sharing capability;
forwarding the StartAppinstance message to the second User Equipment; and
after forwarding the StartAppinstance message, exchanging synchronization information corresponding to the application between the User Equipment and the second User Equipment.

8. The IMS apparatus of claim 7, wherein the sharing capability comprises one or more of: white boarding, map sharing or document sharing.

9. The IMS apparatus of claim 7, wherein the MSRP media session comprises a dedicated Evolved Packet System (EPS) bearer.

10. The IMS apparatus of claim 9, wherein the dedicated EPS bearer has a lower Quality of Service than a default EPS bearer.

11. The IMS apparatus of claim 7, wherein the MSRP media session is used for Application Control Protocol (ACP) instructions and at least one additional media session is provided for user traffic.

12. The IMS apparatus of claim 11, wherein the at least one additional media session is carried on an unreliable transport protocol.

13. A non-transitory storage unit having instructions executable by processor circuitry of an Internet Protocol Multimedia Subsystem (IMS) to perform operations comprising:
receiving, from a User Equipment, a SIP INVITE message including a Session Description Protocol (SDP) field indicating to set up a Message Session Relay Protocol (MSRP) media session between the User Equipment and the IMS;
establishing a Session Initiation Protocol (SIP) session between the User Equipment and a SIP application server within the IMS;
establishing the MSRP media session between the User Equipment and a Media Resource Function (MRF) controlled by the SIP application server;
receiving, via the MSRP media session, an indication of a sharing capability that is supported by the User Equipment; and
forwarding, via the MRF, the indication of a sharing capability to a second User Equipment, the forwarding including communicating the indication of the sharing capability over the MSRP media session between the second User Equipment and the MRF;
wherein the operations further comprise:
sending, to the second User Equipment, a second SIP INVITE message;
establishing the SIP session between the second User Equipment and the SIP application server;
establishing the MSRP media session between the second User Equipment and the MRF;

receiving, from the User Equipment, a StartAppinstance message corresponding to an application specified in the indication of the sharing capability;

forwarding the StartAppinstance message to the second User Equipment; and after forwarding the StartAppinstance message, exchanging synchronization information corresponding to the application between the User Equipment and the second User Equipment.

14. The non-transitory storage unit of claim 13, wherein the sharing capability comprises one or more of: white boarding, map sharing or document sharing.

15. The non-transitory storage unit of claim 13, wherein the MSRP media session comprises a dedicated Evolved Packet System (EPS) bearer.

16. The non-transitory storage unit of claim 15, wherein the dedicated EPS bearer has a lower Quality of Service than a default EPS bearer.

17. The non-transitory storage unit of claim 13, wherein the MSRP media session is used for Application Control Protocol (ACP) instructions and at least one additional media session is provided for user traffic.

18. The non-transitory storage unit of claim 17, wherein the at least one additional media session is carried on an unreliable transport protocol.

* * * * *